United States Patent
Delurgio et al.

(10) Patent No.: US 7,702,615 B1
(45) Date of Patent: Apr. 20, 2010

(54) CREATION AND AGGREGATION OF PREDICTED DATA

(75) Inventors: Phillip Dennis Delurgio, Foster City, CA (US); Chad William Whipkey, Foster City, CA (US); Michael A. Shwe, San Francisco, CA (US); Steven John Peter Hillion, San Francisco, CA (US); Brian Frederick Babcock, San Mateo, CA (US)

(73) Assignee: M-Factor, Inc., San Mateo, CA (US)

( * ) Notice: Subject to any disclaimer, the term of this patent is extended or adjusted under 35 U.S.C. 154(b) by 222 days.

(21) Appl. No.: 11/267,613

(22) Filed: Nov. 4, 2005

(51) Int. Cl.
*G06F 7/00* (2006.01)
*G06F 17/30* (2006.01)
(52) U.S. Cl. ............................. 707/2; 705/10
(58) Field of Classification Search ............ None
See application file for complete search history.

(56) References Cited

U.S. PATENT DOCUMENTS

| | | | | |
|---|---|---|---|---|
| 5,491,629 A | * | 2/1996 | Fox et al. | 702/3 |
| 5,796,932 A | * | 8/1998 | Fox et al. | 707/104.1 |
| 7,010,494 B2 | * | 3/2006 | Etzioni et al. | 705/1 |
| 7,302,421 B2 | * | 11/2007 | Aldridge | 707/2 |
| 7,392,248 B2 | | 6/2008 | Bakalash et al. | |
| 2002/0116237 A1 | * | 8/2002 | Cohen et al. | 705/7 |
| 2003/0046130 A1 | * | 3/2003 | Golightly et al. | 705/7 |

OTHER PUBLICATIONS

OLAP and OLAP Server Definitions, The OLAP Council, Jan. 1995, 8 pages, http://altaplana.com/olap/glossary.html.

* cited by examiner

*Primary Examiner*—Khanh B Pham
*Assistant Examiner*—Azam Cheema
(74) *Attorney, Agent, or Firm*—Blakely, Sokoloff, Taylor & Zafman LLP (57) ABSTRACT

Methods and apparatuses for predicting set of multi-dimensional dependent data and non-measurable data from a set of multi-dimensional historical dependent and causal data are described. In one embodiment, the method comprises receiving input data that comprises multi-dimensional historical dependent data and causal data and anticipated activity data, determining a set of multi-dimensional predicted dependent data using a predictive model and the input data, creating non-measurable data based on the set of multi-dimensional predicted dependent data and the input data.

22 Claims, 10 Drawing Sheets

CREATION AND AGGREGATION OF PREDICTED DATA

FIELD OF THE INVENTION

This invention relates generally to analysis of multi-dimensional data and more particularly to dynamic multi-dimensional analysis of consolidated enterprise data supporting creating and analysis of predicted data.

BACKGROUND OF THE INVENTION

On-Line Analytical Processing (OLAP) is a category of software technology that enables insight into enterprise data through access to a wide variety of views of the enterprise data. Enterprise data is a large collection of business data, such as historical sales data of commercial items based on such attributes as location, market, product, weather, etc. With the large amount of data available, an analyst typically seeks to discern trends or relationships in the business data, for example, how many units of a product sold over the summer in three Midwestern states. Typically, such a query in enterprise data is a laborious task. OLAP seeks to reduce the amount of time involved by pre-calculating common types of queries. The analyst uses the OLAP results to rapidly evaluate the desired historical relationships in data at a more meaningful level. OLAP reduces the enterprise data granularity by aggregating the enterprise data into larger aggregations. For example, if the enterprise data breaks down products sales at the store level for a particular chain, an OLAP pre-calculated query may only return the product sales for the chain.

OLAP has been used to analyze dependent data, such as, but not limited to, sales volume of product(s), revenue, profits, etc. The data for OLAP is typically organized into a volume cube representing sales volume of a product for different locations (or markets, depending on the granularity of the resulting aggregated volume data). OLAP operates across two large, general classes of data: dependent and causal. Dependent data is data that is determined by the values of the causal data. For example, sales volume of a product is a market at a point in time that may be the result of causal data (e.g. price, weather, advertising, etc.). Furthermore, OLAP uses causal data to develop insights into the factor affecting dependent data, such as product volume. OLAP simultaneously aggregates or determines dependent and causal data. For example, if OLAP aggregated volume in three Midwestern states, OLAP should also calculate an aggregate, or average price in those states. Causal data is a collection of data (e.g. price, advertising, weather, etc.) that affects the dependent data (e.g., sales, revenue, profits, etc.). OLAP is useful to an analyst because it provides the base data from which analysts may make their own predictions of future data by understanding past trends or relationships and drawing conclusions about the future through inference.

However, OLAP typically analyzes past trends and not future trends, because OLAP assumes the existence of historical data in the form of dependent and causal data in order to perform its analyses. In addition, OLAP reduces dependent data granularity by aggregating the dependent data with pre-calculated queries.

SUMMARY OF THE DESCRIPTION

Methods and apparatuses for predicting a set of multi-dimensional dependent data and non-measurable data from a set of multi-dimensional historical dependent and causal data are described. In one embodiment, the method comprises receiving input data that comprises multi-dimensional historical dependent data and historical causal data and anticipated causal data, determining a set of multi-dimensional predicted dependent data using a predictive model and the input data, creating non-measurable data based on the set of multi-dimensional predicted dependent data and the input data.

BRIEF DESCRIPTION OF THE DRAWINGS

The present invention is illustrated by way of example and not limitation in the figures of the accompanying drawings in which like references indicate similar elements.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1A:
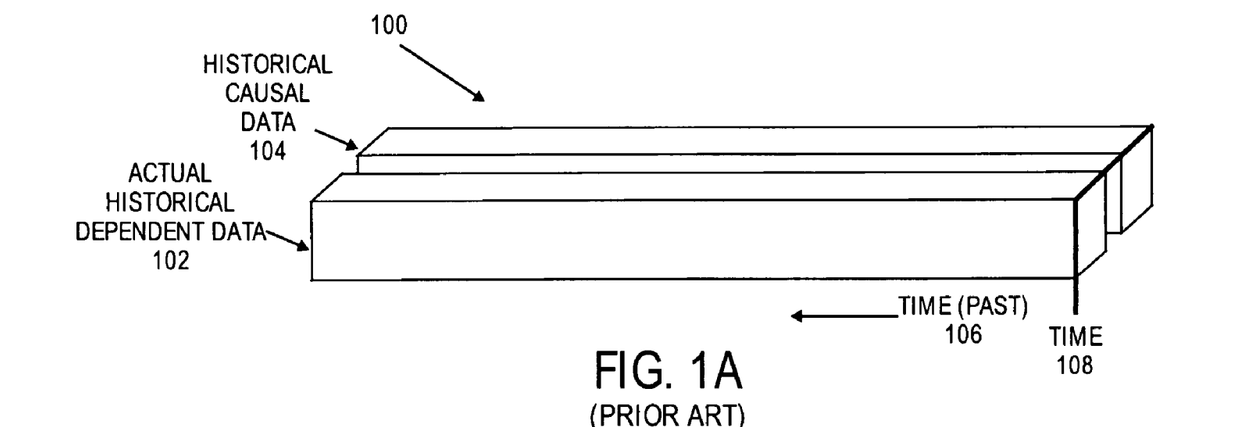
FIG. 1A is a block diagram illustrating one embodiment of the relationship of actual historical dependent data to causal data.

FIG. 1A is a block diagram illustrating one embodiment 100 of the relationship of actual historical dependent data 102 to historical causal data 104. In FIG. 1A, a cube of actual historical dependent data 102 represents a time series of data formed into a multi-dimensional cube. Although in one embodiment, the dimensions of actual volume cube 102 are time, products and locations, alternate embodiments may have more, less and/or different dimensions. Actual historical dependent data 102 ends at a specific time 108. The portion of the cube to the left of actual historical dependent data 102 represents the very earliest dependent data available.

To estimate a predictive model of the data in actual historical dependent data 102, an analyst collects historical causal data 104. Historical causal data 104 includes business drivers that potentially affect actual historical dependent data 102. A business driver is an anticipated activity that could affect actual historical dependent data 102. Examples of business drivers are, but are not limited to, in-store activities (e.g., price, display, etc.), advertising (e.g., targeted rating points, gross rating points, print circulars, etc.), weather (e.g., temperature, change in temperature, precipitation, etc.), distribution, competitive activity (own similar products as well as competition products), etc. Typically, the causal data is employed in a predictive model that predicts the historical dependent data. In addition, the predictive model aids an analyst in better understanding how influential each business driver is in affecting dependent data. For example, one set of dependent data may be sensitive to price, while other sets of dependent data are sensitive to seasonal or weather changes.

The embodiment in FIG. 1A is an illustration of one embodiment of actual historical dependent data 102 and historical causal data 104. However, actual historical dependent data 102 and historical causal data 104 do not always end at a specified time 108. In other embodiments, actual historical dependent data 102 and historical causal data 104 can be for any past time period and of varying length, such as a days, weeks, months, years, etc. Furthermore, actual historical dependent data information 102 and historical causal data 104 can have different time lengths or represent overlapping periods of time.

Figure 1B:
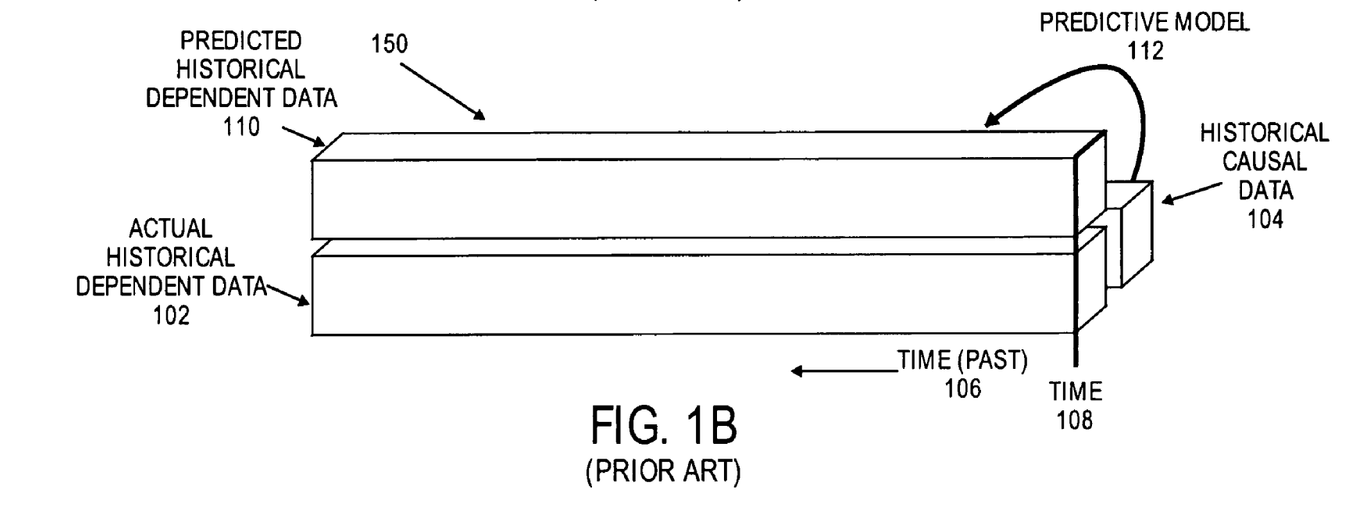
FIG. 1B is a block diagram illustrating one embodiment of the relationship of predicted historical dependent data calculated based on historical causal data.

FIG. 1B is a block diagram illustrating one embodiment 150 of predicted historical dependent data 110 that is derived from causal data. Predictive model 112 is used to generate predicted historical dependent data 110 from historical causal data 104. There are many processes known in the art to create predictive models from causal dependent information. In addition, by comparing predicted historical dependent data 110 with actual historical dependent data 104, an analyst can determine the reliability of the predictive model 112. An analyst can use predictive model 112 as a basis for analyzing the results and determine the business drivers that affect actual historical dependent data 102 or predicted historical dependent data 110. Typically, the analyst infers or speculates about past/future trends and/or relationships based on actual historical dependent data 112. However, FIGS. 1A-B only illustrate results based on aggregated historical data and did not allow prediction of future results. Furthermore, an analyst cannot breakdown contributions to the dependent data due to the causal data (e.g., determine percent sales volume caused by advertising, price changes, weather fluctuations, etc.).

Figure 2:
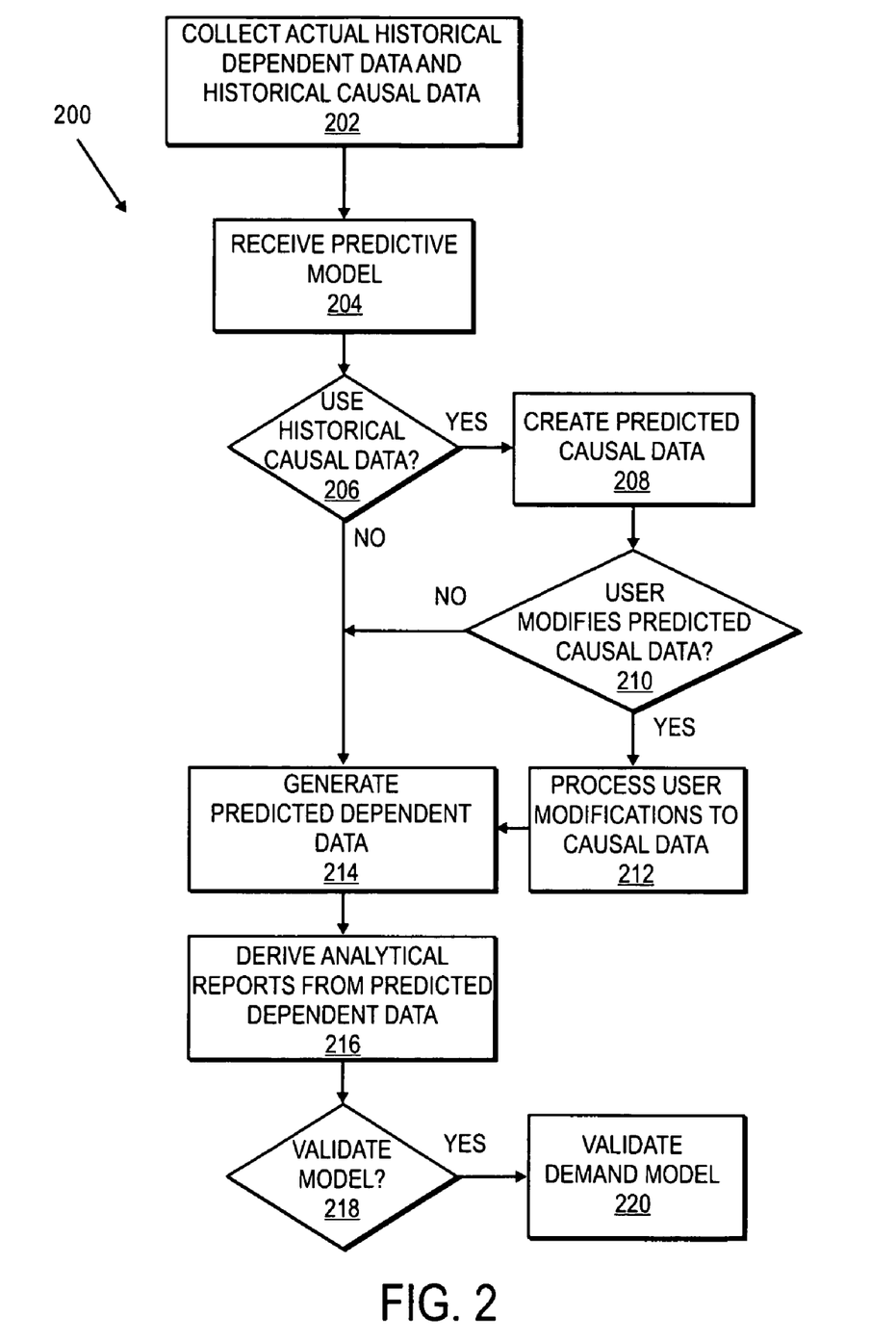
FIG. 2 is a flow diagram of one embodiment of a process for generating predicted dependent data from historical dependent data and causal data.

FIG. 2 is a flow diagram of one embodiment of a process 200 to generate predicted dependent data from historical dependent data and causal data. The process may be performed by processing logic that may comprise hardware (e.g., circuitry, dedicated logic, programmable logic, microcode, etc.), software (such as run on a general purpose computer system or a dedicated machine), or a combination of both. In one embodiment, process 200 is performed by data processing system 800 of FIG. 8.

Returning to FIG. 2, at block 202, process 200 begins by processing logic collecting the historical dependent data and causal data (e.g. historical actual dependent data 102 and historical causal data 104 as illustrated in FIGS. 1A-B). In one embodiment, historical dependent data is typically the form of unit sales of equivalent products. Equivalence is used to normalize sales of a particular product that is sold in different packaging sizes. For example, for soda sales, one equivalent is 24 eight-ounce cans. Thus, two 12-pack cans of twelve ounce sodas are one and one half equivalents. At block 204, processing logic receives a predictive model using the predicted causal data. A predictive model is a mathematical model estimated by using the historical dependent and causal data. There are many processes known in the art to create predictive models from causal information. In one embodiment, a generic predictive model is shown in Equation (1):

$$\text{Volume} = \alpha + \beta_1 x_1 + \beta_2 x_2 + \ldots + \beta_n x_n \quad (1)$$

where $\alpha$ is the intercept to represent the base level of demand for the product, $\beta_i$ are coefficients to quantify the expected dependent data response to $x_i$, and $x_i$ are the covariates. Covariates relate to the business drivers as described below. For example, in one embodiment, a simple predictive model for the sales volume of an item is based on display advertising, feature advertising (e.g. print advertising), price, weather and television advertising. The predictive model for this embodiment is:

$$\text{Volume} = \alpha + \beta_{Display}*\text{Display} + \beta_{Ad}*\text{Ad} + \beta_{Price}*\text{Price} + \beta_{TV}*\text{TV} + \beta_{Weather}*\text{Weather} \quad (2)$$

From Equation (1) or some other predictive model, processing logic computes the predicted dependent data.

As mentioned above, each covariate ($x_i$) relates to business drivers that potentially affect the dependent data. In one embodiment, the covariate is the business driver. Alternatively, processing logic mathematically transforms the business driver into the covariate. This is typically used when changes in the business driver do not affect the dependent data in a linear fashion. For example, the effect of product price on the volume may be large around $1.99/equivalent, but not large if the price were $3.99/equivalent. In this case, processing logic uses a covariate of ln(price) instead of price itself. Taking the example of the simple predictive model presented in Equation (2) above, processing logic would then use the predictive model of:

$$\text{Volume} = \alpha + \beta_{Display}*\text{Display} + \beta_{Ad}*\text{Ad} + \beta_{Price}*ln(\text{Price}) + \beta_{TV}*\text{TV} + \beta_{Weather}*\text{Weather} \quad (3)$$

Processing logic supports numerous types of mathematical transforms of business drivers to covariates such as simple arithmetic transforms. Other covariates have time delaying effects. For example, an expenditure of advertising in one time period can continue to affect the dependent data for several successive time periods. To model this type of effect, a covariate is a decay function that decreases in time after an initial input value. Furthermore, more than one business driver can affect covariates. For example, a competing dependent data can affect a dependent data by increasing or decreasing the product's dependent data.

Processing logic can equivalently use other predictive models known in the art. For example, in one embodiment, processing logic uses a model (Equation (4)) that is a sum of five models related to the five in-store grocery merchandising conditions used in the US:

$$\text{Volume}_{total} = \text{Volume}_{DispFeat} + \text{Volume}_{Display} + \text{Volume}_{Feature} + \text{Volume}_{TPR} + \text{Volume}_{NoPromo} \quad (4)$$

where $\text{Volume}_{DispFeat}$ is the volume due to a product offered with a feature advertisement and display, $\text{Volume}_{Display}$ is the volume due to the product offered with a display but no feature advertisement, $\text{Volume}_{feature}$ is the volume due to the product offered with a feature advertisement but no display, Volume$_{TPR}$ is the volume due to the product offered with a temporary price reduction (TPR), and Volume$_{feature}$ is the volume due to the product offered no display, feature advertising or TPR. Each volume equation has its own intercept, coefficients, and covariates as follows:

Volume$_{DispFeat}$=α+β$_1$ACV$_{DispFeat}$+β$_2$x$_2$+ . . .

Volume$_{Display}$=α+β$_3$ACV$_{Display}$+β$_4$x$_4$+ . . .

Volume$_{Feature}$=α+β$_5$ACV$_{Feature}$+β$_6$x$_6$+ . . .

Volume$_{TPR}$=α+β$_7$ACV$_{TPR}$+β$_8$x$_8$+ . . .

Volume$_{NoPromo}$=α+β$_9$ACV$_{NoPromo}$+β$_{10}$x$_{10}$+ . . .   (5)

where β$_2$, β$_4$, β$_6$, β$_8$, and β$_{10}$ are coefficients for other covariates and typically are the same (e.g. weather, price, etc.) for the five sub-volume equations in Equation (5).

At block 206, processing logic determines whether to use predicted causal data or historical causal data. If processing logic uses historical causal data, processing logic generates predicted historical dependent data at block 214. On the other hand, if processing logic uses predicted causal data, processing logic creates predicted causal data, at block 208. The predicted causal data represents the information affecting predicted future dependent data. The predicted causal data is typically the same type of information as for historical causal data 104, such as in-store activities, advertising, weather, competitive activity, etc. In one embodiment, processing logic generates the predicted causal data from the historical causal information. In this embodiment, the same values used for in-store activities, advertising, etc., from a similar time period in the past are used for a time period in the future. For example, processing logic uses the same historical causal data for a product from March 2005 for the predicted causal data in March 2006 is used. In another embodiment, processing logic uses the same historical causal information for the predicted causal information, but processing logic makes a change to some or all of historical causal data. For example, processing logic uses the same historical causal data from March 2004 plus an overall three percent (3%) increase for the predicted causal data in March 2006. As another example, processing logic uses the same historical causal data but decreases all marketing business drivers by five percent (5%). In a still further example, processing logic uses the same historical causal data, but predicts for an unusually warm summer. In a further embodiment, processing logic generates the predicted causal data from a market researcher's input. In another embodiment, processing logic generates the predicted causal data from another product's historical causal data. In another embodiment, processing logic generates the predicted causal data from a combination of the ways describe above.

Figure 3A:
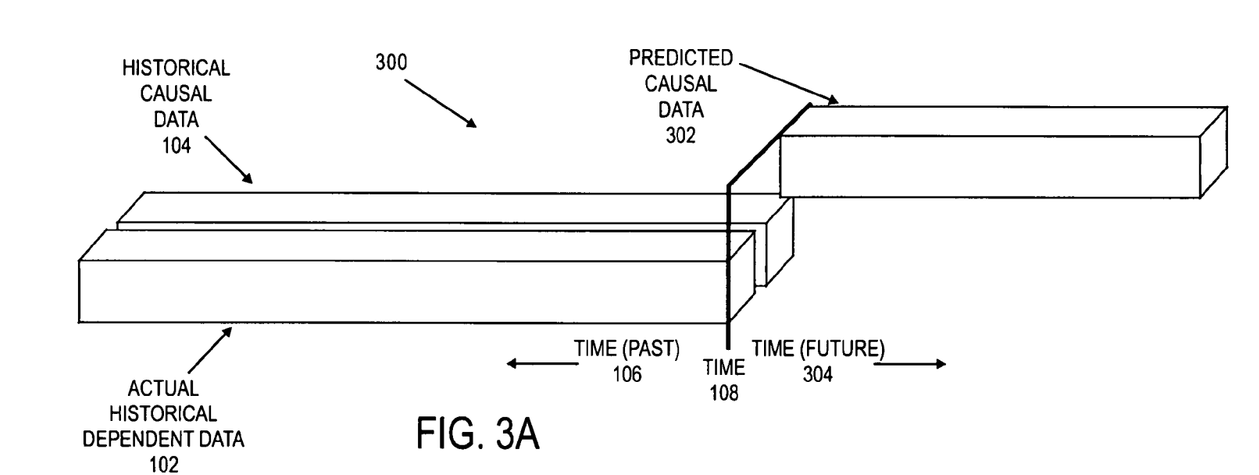
FIG. 3A is a block diagram illustrating one embodiment of deriving predicted causal data from historical causal data.

FIG. 3A is a block diagram illustrating one embodiment of process 200 that derives predicted causal data 302 from historical causal data 104 as described in FIG. 2 at block 204. In FIG. 3A, historical actual dependent data 102 and historical causal data 104 are collected as in FIG. 1A-B. As in FIG. 1A-B, the three dimensions of actual dependent data cube 102 are time, products and locations. Actual historical dependent data 102 and historical causal data 104 end at a specified time 108, while the left of actual historical dependent data 102 and historical causal data 104 represent the earliest dependent data available.

To the right of time 108, the timeline 304 progresses into the future. Predicted causal data 302 starts at a specified time 108 and progresses to the right into the future. As stated above, the predicted causal data 302 is copied from the historical causal data 104, derived from the historical causal data 104, derived from some other product causal data, generated from user input or a combination thereof. This embodiment is meant to be an illustration of predicted causal data 304 and does not imply that predicted causal data 304 always starts at present time 108. Other embodiments of predicted causal data 304 can be for any future time period and of varying length, such as a days, weeks, months, years, etc. Furthermore, actual causal data 104 and predicted causal data 302 can have different time lengths.

Returning to FIG. 2, at block 210, processing logic determines if the analyst modified the predicted causal data. If so, at block 212, processing logic processes the market researcher's changes to the predicted causal data. Examples of possible modifications to the predicted causal data include, but not limited to, having more/less television advertising as compared with a previous time period, anticipating hotter/cooler weather, raising/lowering the price, etc. In either case, processing logic proceeds to block 214.

At block 214, processing logic generates predicted dependent data from the predictive model and either the historical or predicted causal data. In one embodiment, processing logic generates predicted historical dependent data using historical causal data. Alternatively, processing logic generates predicted future dependent data using predicted causal data.

In one embodiment, processing logic generates the predicted dependent data with the same granularity as the historical dependent data. As an example of dependent data prediction and by way of illustration, assume processing logic uses the simple predictive model in Equation (2). Further assume that business drivers and coefficients have the following values as listed in Table 1

TABLE 1

Sample business drivers and coefficients.

| Business Drivers | Values | Coefficients | Values |
|---|---|---|---|
| Display | 20 | β$_{Display}$ | 3.2 |
| Feature (Ad) | 80 | β$_{Ad}$ | 0.11 |
| Price | $2.49 | β$_{Price}$ | −1.6 |
| TV | 0.3 | β$_{TV}$ | 20 |
| Weather | 72 | β$_{Weather}$ | 0.13 |

Figure 6:
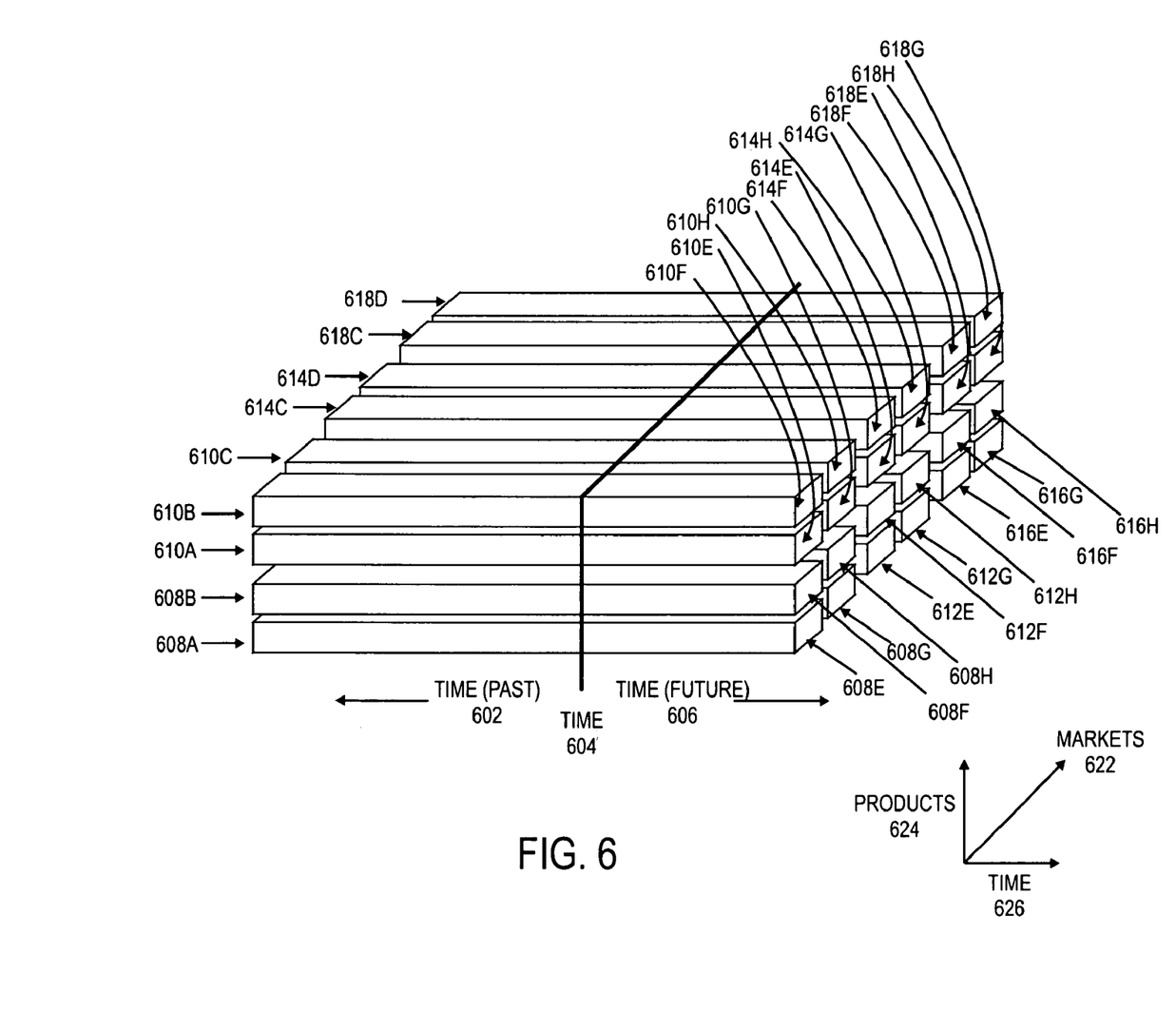
FIG. 6 is a block diagram illustrating one embodiment of multiple dependent data and causal data.

Using the predictive model in Equation (2), processing logic predicts a dependent data of 86.7. If the price were to decrease to $1.99, then the predicted dependent data rises to 87.5. Although this is a simple example, predictive models are typically more complicated involving numerous business drivers and multiple product dependencies. For example, as shown in FIG. 6, below, processing logic can model thousands of products in hundreds of markets over as many as a hundred weeks.

Figure 3B:
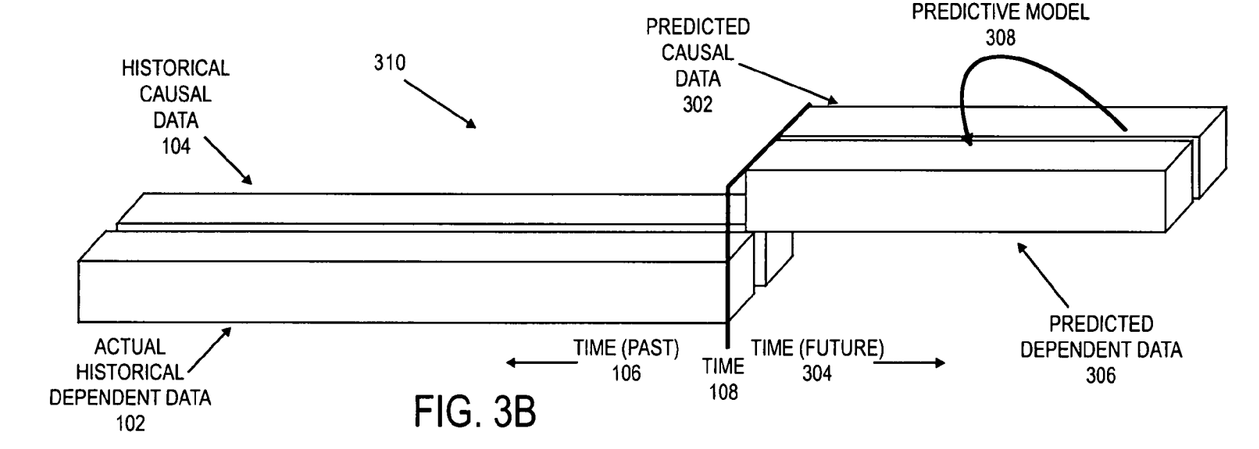
FIG. 3B is a block diagram illustrating one embodiment of deriving predicted dependent data from predicted causal data.

FIG. 3B is a block diagram illustrating one embodiment of process 200 that derives predicted dependent data 306 from predicted causal data 302 by using predictive model 308 as described in FIG. 2 at block 212. In FIG. 3B, historical actual dependent data 102 and historical causal data 102 is collected as in FIG. 1A-B. The three dimensions of actual dependent data cube 102, historical causal data 104, predicted causal data 302 and predicted dependent data 306 are time, products and locations. Actual historical dependent data 102 and historical causal data 104 end at a specified time 108, while the left of actual historical dependent data 102 and historical causal data 104 represent the earliest dependent data available. As in FIG. 3A, the left of predicted causal data is time 108 or the beginning of predicted causal data 302. Furthermore, processing logic generates predicted dependent data 306 using predicted causal data 302 and predictive model 308. Like predicted causal data 302, predicted dependent data 306 starts to the left of time 108 and progresses into the future via timeline 304. This embodiment is meant to be an illustration of predicted dependent data 306 and does not imply that predicted dependent data 306 always starts at time 108. Other embodiments of predicted dependent data 306 can be for any time period in the future and of varying length, such as a day, week, month, year, etc. Furthermore, predicted dependent data 306 and predicted causal data 302 can have different time lengths or represent overlapping time periods.

Returning to FIG. 2, at block 216, processing logic derives analytical reports from the predicted dependent data. Processing logic can generate the analytical reports from predicted historical dependent data and/or predicted future dependent data. Because the granularity for each of the sets of predicted dependent data is the same, processing logic can generate the same types of analytical reports. Processing logic typically generates dependent data decomposition reports, "due-to" reports and scenario simulations or optimizations. These reports provide derived information from the dependent data (e.g., revenue, costs, etc.), causal data contribution to the dependent data (e.g., percent volume change caused by price, advertising, weather fluctuations, etc.) and/or combinations thereof (incremental revenue changes due to advertising, price, etc.). In addition, processing logic generates financial information reports from the predicted dependent data, such as profit and loss statements that include revenue, costs, and operating profit from a manufacturer and distributor standpoints. Generation of analytical reports is further described in FIG. 7, below.

Figure 4:
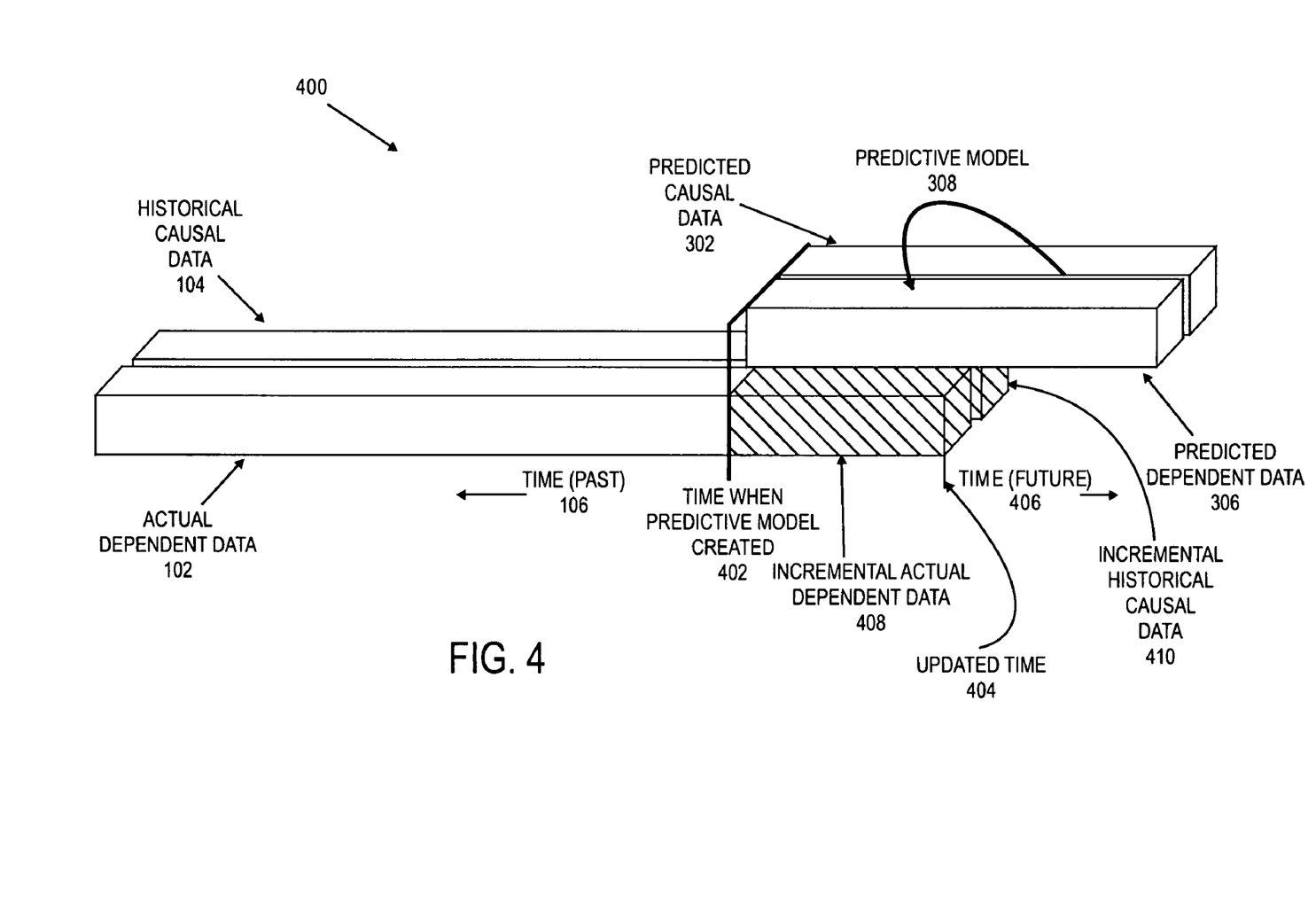
FIG. 4 is a block diagram illustrating one embodiment that compares predicted dependent data and incremental historical dependent data.
Figure 5:
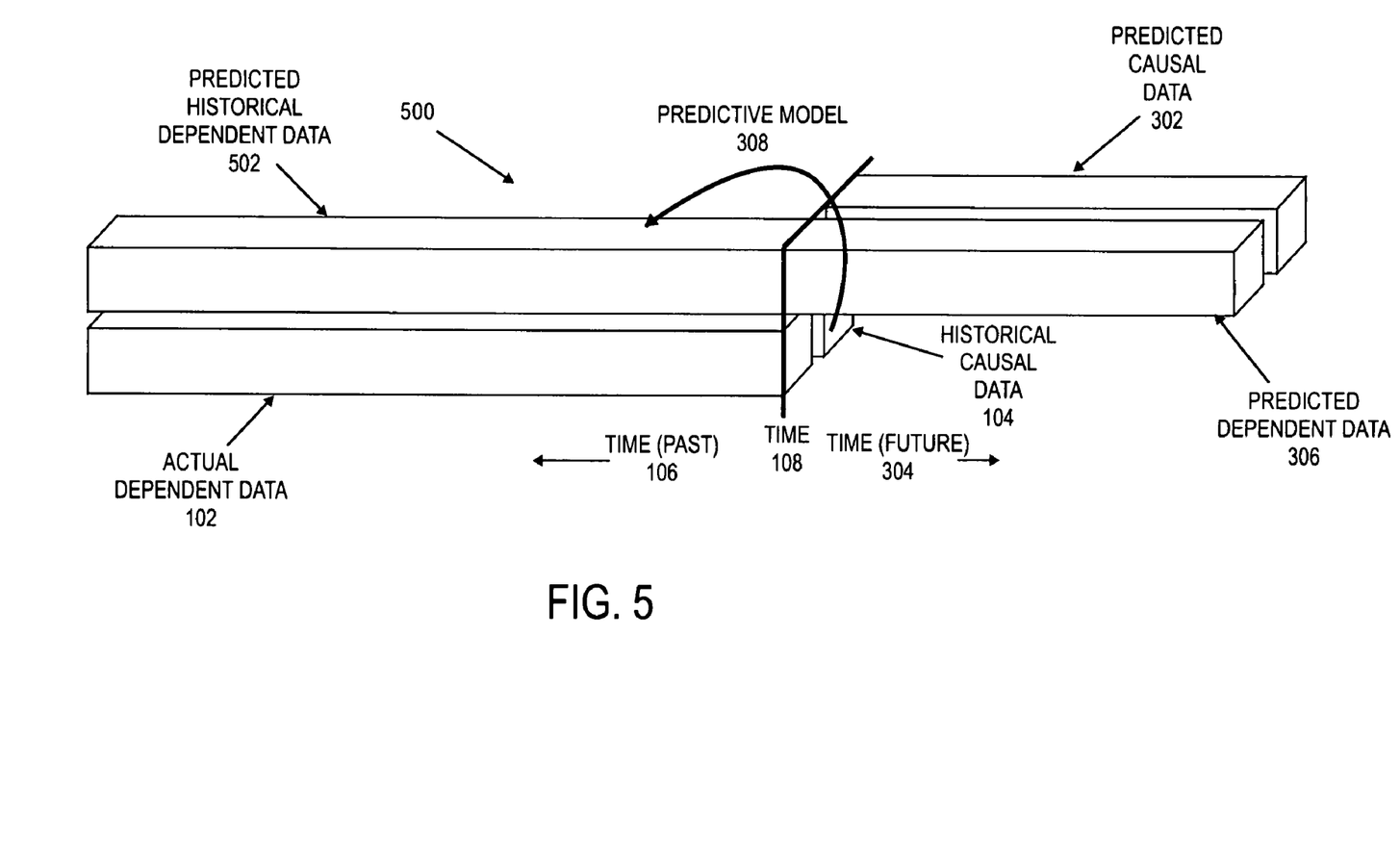
FIG. 5 is a block diagram illustrating one embodiment that generates predicted dependent data.

At block 218, processing logic determines if the predictive model should be validated. Although in one embodiment the analyst signals to the processing logic that the model should be validated, alternate embodiments may determine whether a model should be validated by different means (i.e., processing logic automatically determine whether the model should be validated, processing logic determines whether model should be validated with input from the analyst, etc.) If so, at block 220, processing logic validates the predictive model by comparing predicted historical dependent data information with actual historical dependent data information. Processing logic can compare with the actual historical dependent data in two ways: (i) accruing additional actual dependent data and comparing the additional historical dependent data with the predicted dependent data as shown in FIG. 4 below or (ii) predicting historical dependent data information using the predictive model and comparing the predicted historical dependent data information with the existing actual historical dependent data as shown in FIG. 5 below. Once the dependent data used in the comparison is generated or collected, processing logic compares the two sets of dependent data information using one of many known schemes to compare dependent data, such as, but not limited to variance analysis, holdout sample, model statistics, etc. A close comparison between the dependent data sets indicates the predictive model is a valid representation of dependent data. However, if the dependent data sets vary quite markedly, the predictive model should be changed or updated.

FIG. 4 is a block diagram illustrating one embodiment of process 200 that compares predicted dependent data information 306 with the accrued historical dependent data information 408 as described in FIG. 2 at block 216. As in FIG. 3B, FIG. 4 illustrates actual historical dependent data 102 and historical causal data 104 as time evolving cubes ending at time 402. Furthermore, FIG. 4 illustrates predicted dependent data 306 and predicted causal data 302 starting at time 402. Processing logic uses predictive model 308 to generate the predicted dependent data 306 from the predicted causal data 302. In addition, FIG. 4 illustrates accrual of additional incremental actual dependent data 408 and incremental causal data 410 because time has evolved from time 402 when the causal data was first predicted 402 to an updated present time 404. To the left of updated present time is the historical timeline 412 and to the right is the future timeline 404. Because time has evolved, additional dependent data and causal data can be collected and is represented as incremental actual dependent data 408 and increment causal data 410. Incremental actual dependent data 408 is compared with the same portion of predicted dependent data 306 to determine if predictive model 308 is reliable.

FIG. 5 is a block diagram illustrating one embodiment of process 200 that compares predicted dependent data 306 and predicted historical dependent data information 502 as described in FIG. 2 at block 216. As in FIG. 3B, FIG. 5 illustrates actual historical dependent data 102 and historical causal data 104 as time evolving cubes ending at the present time 108. Furthermore, FIG. 5 illustrates predicted dependent data 306 and predicted causal data 302 starting at present time 108. In addition, FIG. 5 illustrates processing logic generating predicted historical dependent data 502 from historical causal data 104 using predictive model 308. Predicted historical dependent data 502 is different from predicted historical dependent data 110 because predicted historical dependent data 502 has the same granularity as historical causal data 104. Processing logic uses the predicted historical dependent data 502 to validate predictive model 308 as described further at block 216 above.

Process 200 offers a powerful way to predict future dependent data and gain insight to the business drivers that predominantly affect the predicted dependent data. Because processing logic uses the full granularity of actual historical dependent data 102 and historical causal data 104 and propagates this granularity into the predicted causal data 302, predicted dependent data 306 and predicted historical dependent data 502, processing logic can calculate the analytical reports at any level of granularity supported by the underlying data. Thus, unlike traditional OLAP, processing logic allows an analyst the capability to calculate affects to the dependent data at a very low level of granularity, by marketing variable, for example. In addition, processing logic allows analytical reports based on predicted future dependent data. This is advantageous because future predictions of dependent data is performed on a set of granular dependent data and not based on predictions from aggregated historical data as with OLAP. Furthermore, process 200 allows an analyst the ability to calculate contributions to dependent data (e.g. volume changes) and data computed from dependent data (e.g. revenue changes). In addition, an analyst can still make inferences and/or speculations based on the predicted historical and/or future dependent data.

FIG. 6 is a block diagram illustrating one embodiment 600 generating predicted causal and dependent data information for multiple products and markets. FIGS. 3-5 illustrate various cubes of actual and predicted data for one product and market. Typically, market planning must span multiple products (often thousands), in multiple markets (hundreds) for many weeks (often 100 weeks or more). FIG. 6 illustrates multiple sets of product cubes (608-618). Within each product cube set, there are eight distinct cubes as listed in Table 2.

TABLE 2

FIG. 6 cube types.

| Figure Label | Cube Type |
|---|---|
| A | Actual Historical Dependent data |
| B | Predicted Historical Dependent data |
| C | Actual Historical Causal data |
| D | Predicted Historical Causal data |
| E | Actual Future Dependent data |
| F | Predicted Future Dependent data |
| G | Actual Future Causal data |
| H | Predicted Future Causal data |

All eight cube types are present in FIG. 6, although not every cube type for every product 608-618 is visible in FIG. 6. Although in one embodiment, the product cubes are organized as different products 624 in the z-direction, different markets 622 in the y-direction and time changing in the x-direction, alternate embodiments may organize the product cubes in a different fashion (e.g., using different marketing variables, having multiple cubes for different hierarchies of products and/or markets, etc.).

Figure 7:
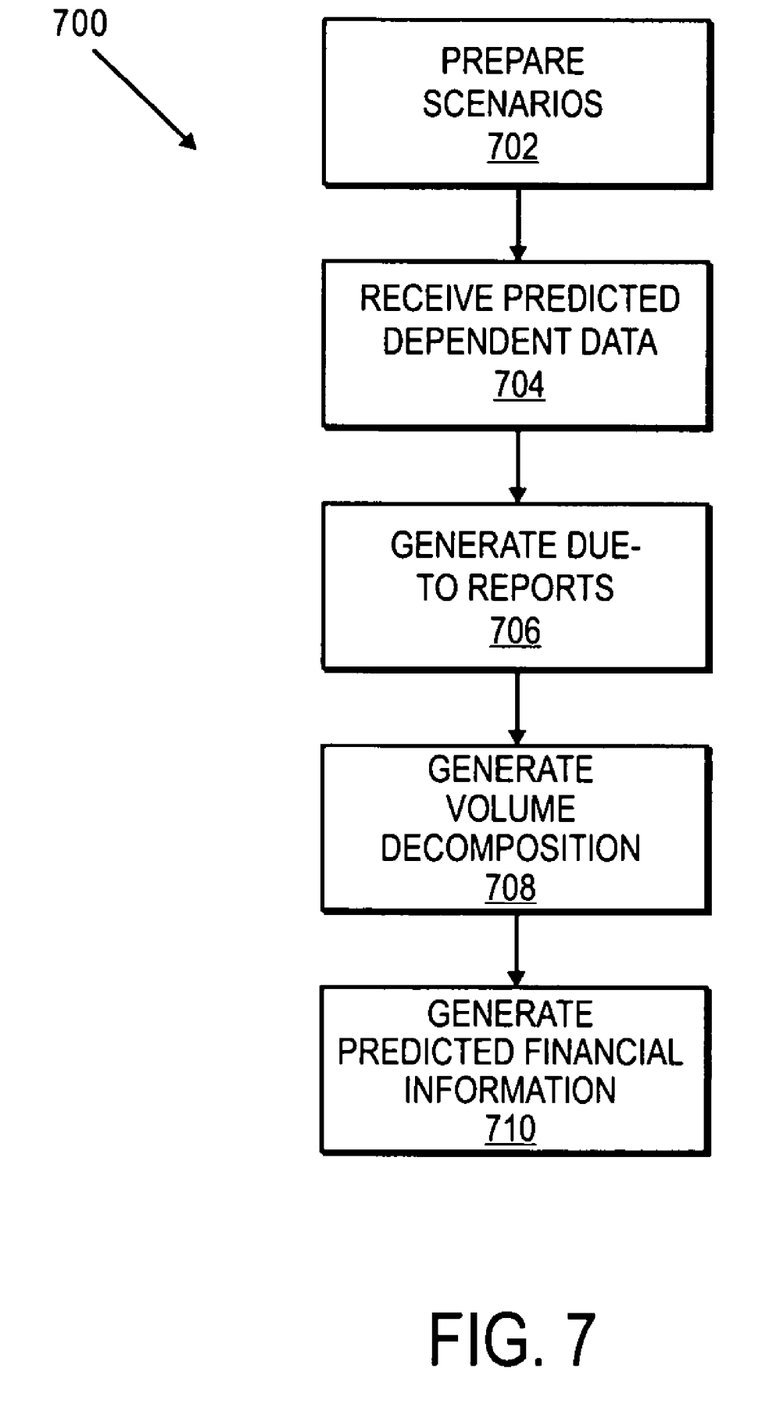
FIG. 7 is a flow diagram of one embodiment of a process for generating analytical reports from the predicted dependent data.

FIG. 7 is a flow diagram of one embodiment of a process 700 to generate analytical reports from the predicted dependent data information. The process may be performed by processing logic that may comprise hardware (e.g., circuitry, dedicated logic, programmable logic, microcode, etc.), software (such as run on a general purpose computer system or a dedicated machine), or a combination of both. In one embodiment, process 700 is performed by data processing system 800 of FIG. 8.

Returning to FIG. 7, at block 702, process 700 begins with processing logic preparing scenarios based on the market researcher's input. A scenario is a set of assumptions and predicted outcomes to a particular business question. For example, in one embodiment, the business question would be: "What would the revenue change be if there was a three percent (3%) product price increase in the Northeast?" Processing logic receives the set of assumptions (three percent price increase, restriction to Northeast market location) and computes the resulting revenue change. Thus, a scenario allows an analyst the capability to determine causal data contributions to data computed from dependent data. Scenarios are a central unit of analysis for market planning and are used to compare expected outcomes under different marketing conditions. During a typical process, there can be dozens or hundreds of scenarios created.

At block 704, processing logic receives the predicted dependent data information. Processing logic uses this information plus other product information such as raw goods costs, manufacturing costs, distribution costs, etc. to generate the analytical reports. At block 706, processing logic calculates due-to reports. A due-to report identifies the amount of dependent data that is due to a specific business driver. Processing logic uses the scenario or a time period as a baseline for the due-to report. Processing logic manipulates the marketing business drivers to determine the dependent data contribution for each marketing business driver. For business drivers that have linear effects to the dependent data, processing logic manipulates that specific business driver to determine the dependent data change. For business drivers that have a non-linear effect and is dependent on other business drivers, processing logic manipulate the specific business driver along with the dependent business drivers to determine a dependent data contribution attributable to each business driver.

At block 708, processing logic generates a volume decomposition report. Similar to the due-to reports, the volume decomposition reports identifies the amount of dependent data that is due to marketing business drivers. The volume decomposition report is a special case of the due-to report. Processing logic starts from a known point where all marketing business drivers have zero contribution and varies the marketing business drivers to determine the volume contributions from each marketing business driver. Thus, processing logic calculates a baseline that represents no marketing activity. Relating back to the predictive model from block 212 in FIG. 2, processing logic calculates a volume from the predictive model that has zero contribution from marketing activities (e.g. no TV or print advertising). Similar to the due-to reports, processing logic takes account of linear and non-linear effects. Both due-to and volume decomposition reports offer an analyst the capability to determine causal data contributions to dependent data.

At block 710, processing logic generates predicted financial information, typically in the form of a profit and loss statement that utilizes the predicted volume information from a scenario. In one embodiment, processing logic generates a profit and loss statement that includes gross revenue, cost of goods sold, net revenue, gross profit, contribution and operating income. Processing logic calculates the cost from fixed costs (i.e., overhead), variable costs (e.g., raw materials, packaging, etc.) and business driver costs (e.g., advertising costs, etc.). Because processing logic generates the financial information from the predicted volume information, processing logic generates the financial information based on the finest level of granularity available. This allows flexibility in analyzing the result and permits drilling down in the results to examine, for example, a market or financial contribution more closely.

Figure 8:
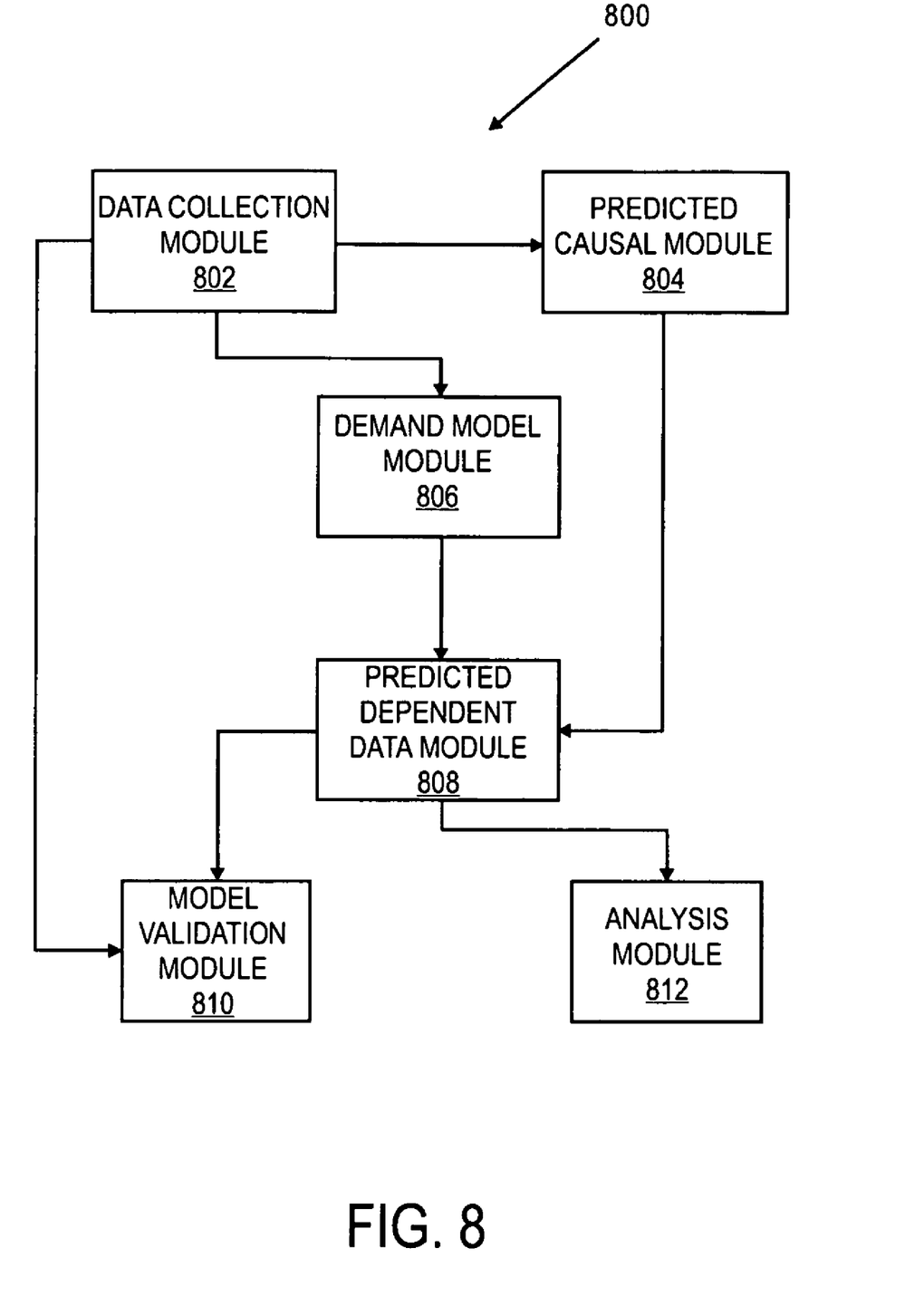
FIG. 8 is a block diagram of one embodiment of a data processing system that generates predicted dependent data.

FIG. 8 is a block diagram of a data processing system 800 that generates predicted dependent data according to one embodiment of the invention. Data processing system can be, but not limited to, a general-purpose computer, a multi-processor computer, several computers coupled by a network, etc. In FIG. 8, system 800 collects the actual historical dependent data and the historical causal data in the data collection module 802. Data collection module 802 collects the information from a local computer, one or more remote computers or a combination of local and remote computers. In this embodiment and referring back to FIG. 2, data collection module 802 performs the function contained in block 202. Returning to FIG. 8, data collection module 802 forwards the historical causal information to predicted causal module 804.

Predicted causal module 804 processes the historical causal data and generates the predicted causal data by simply using the historical causal data from the same relative time period, applying changes to the corresponding historical causal data (e.g. add three percent to marketing business drivers), using historical causal data from another product and/or allowing the analyst to input the information. Referring back to FIG. 1, predicted causal module 804 performs the functions in blocks 206-212.

Returning to FIG. 8, predictive model module 806 uses the historical causal data from data collection module 802 to generate the predictive model. As stated above the predictive model is mathematical model that can be based on intercepts, coefficients and covariates, where the covariates relate to the business drivers. Referring back to FIG. 2, predictive model module performs the functions of block 204.

Returning to FIG. 8, predicted dependent data module 808 uses the predictive model generated by predictive model module 806, the data from the predictive causal model 804, and/or the data from the data collection module 802 to calculate the predicted dependent data. Furthermore, predicted dependent data model 808 can predict historical dependent data that can be used by model validation module 810 to validate the predictive model. Referring back to FIG. 2, predictive model module performs the function of block 214.

Returning to FIG. 8, model validation module 810 validates the predictive model by either comparing predicted historical dependent data with the actual historical dependent data or accruing additional actual historical dependent data and comparing it with the predicted dependent data. Predictive model validation 810 uses many processes known in the state of the art to do the comparison of actual and predicted historical dependent data information, such as, but not limited to, variance analysis, holdout sample, model statistics, etc. Referring back to back to FIG. 2, predictive model validation module 810 performs the functions in blocks 218-220.

Returning to FIG. 8, analysis module 812 generates analytical reports from the predicted dependent data information by generating due-to reports, volume decompositions, scenarios, and financial analysis such as profit and loss statements. Referring back to FIGS. 2 and 7, analysis module 808 performs the functions at block 216 and blocks 702-710.

The processes described herein may constitute one or more programs made up of machine-executable instructions. Describing the process with reference to the flow diagrams in FIGS. 2 and 7 enables one skilled in the art to develop such programs, including such instructions to carry out the operations (acts) represented by logical blocks on suitably configured machines (the processor of the machine executing the instructions from machine-readable media, such as RAM (e.g. DRAM), ROM, nonvolatile storage media (e.g. hard drive or CD-ROM), etc.). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the processes illustrated in the flow diagrams without departing from the scope of the invention and that no particular order is implied by the arrangement of blocks shown and described herein.

Figure 9:
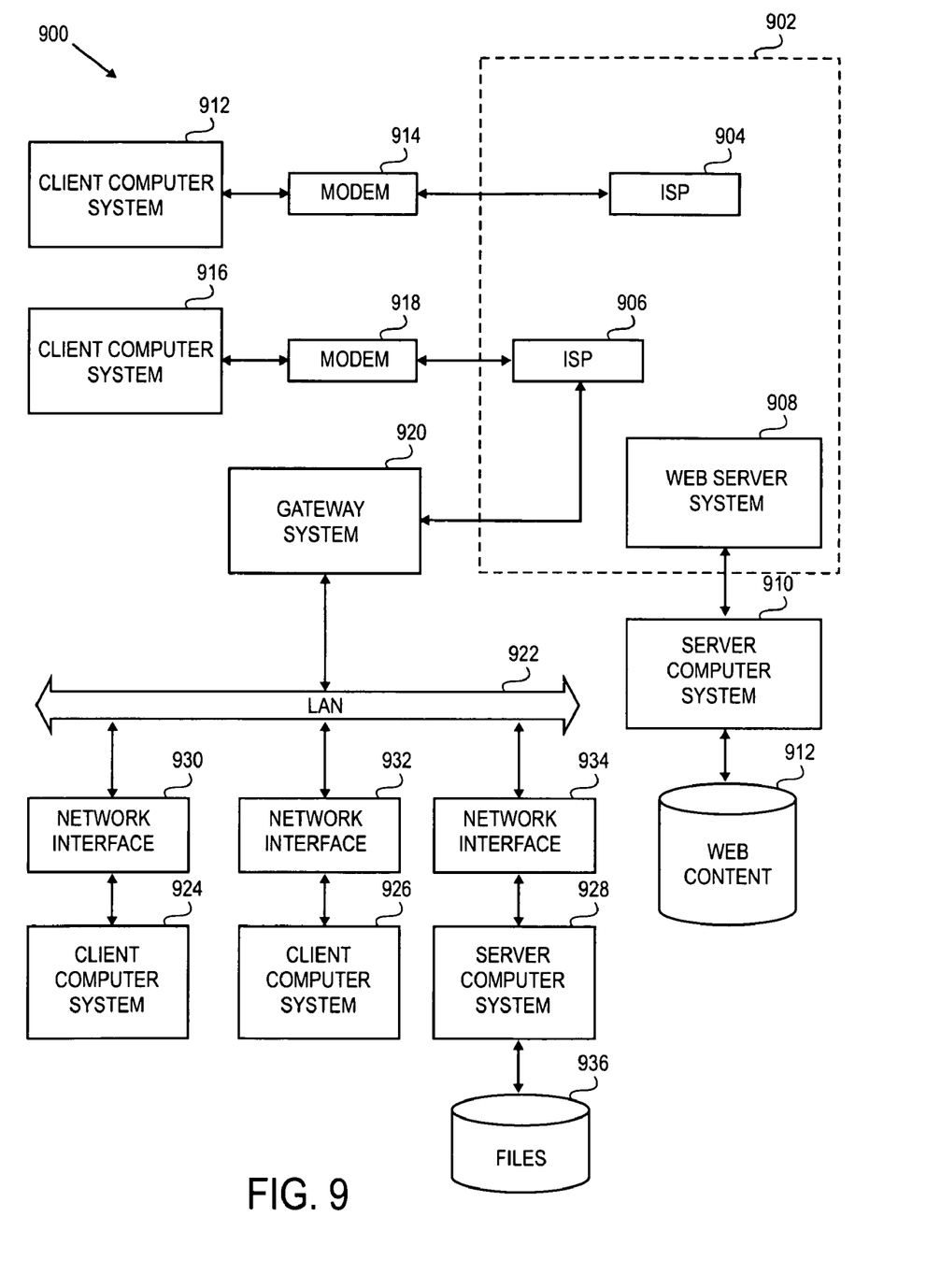
FIG. 9 is a diagram of one embodiment of an operating environment suitable for practicing the present invention.

FIG. 9 shows several computer systems 900 that are coupled together through a network 902, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 902 is typically provided by Internet service providers (ISP), such as the ISPs 904 and 906. Users on client systems, such as client computer systems 912, 916, 924, and 926 obtain access to the Internet through the Internet service providers, such as ISPs 904 and 906. Access to the Internet allows users of the client computer systems to exchange information, receive and send e-mails, and view documents, such as documents which have been prepared in the HTML format. These documents are often provided by web servers, such as web server 908 which is considered to be "on" the Internet. Often these web servers are provided by the ISPs, such as ISP 904, although a computer system can be set up and connected to the Internet without that system being also an ISP as is well known in the art.

The web server 908 is typically at least one computer system which operates as a server computer system and is configured to operate with the protocols of the World Wide Web and is coupled to the Internet. Optionally, the web server 908 can be part of an ISP which provides access to the Internet for client systems. The web server 908 is shown coupled to the server computer system 910 which itself is coupled to web content 912, which can be considered a form of a media database. It will be appreciated that while two computer systems 908 and 910 are shown in FIG. 9, the web server system 908 and the server computer system 910 can be one computer system having different software components providing the web server functionality and the server functionality provided by the server computer system 910 which will be described further below.

Client computer systems 912, 916, 924, and 926 can each, with the appropriate web browsing software, view HTML pages provided by the web server 908. The ISP 904 provides Internet connectivity to the client computer system 912 through the modem interface 914 which can be considered part of the client computer system 912. The client computer system can be a personal computer system, a network computer, a Web TV system, a handheld device, or other such computer system. Similarly, the ISP 906 provides Internet connectivity for client systems 916, 924, and 926, although as shown in FIG. 9, the connections are not the same for these three computer systems. Client computer system 916 is coupled through a modem interface 918 while client computer systems 924 and 926 are part of a LAN. While FIG. 9 shows the interfaces 914 and 918 as generically as a "modem," it will be appreciated that each of these interfaces can be an analog modem, ISDN modem, cable modem, satellite transmission interface, or other interfaces for coupling a computer system to other computer systems. Client computer systems 924 and 916 are coupled to a LAN 922 through network interfaces 930 and 932, which can be Ethernet network or other network interfaces. The LAN 922 is also coupled to a gateway computer system 920 which can provide firewall and other Internet related services for the local area network. This gateway computer system 920 is coupled to the ISP 906 to provide Internet connectivity to the client computer systems 924 and 926. The gateway computer system 920 can be a conventional server computer system. Also, the web server system 908 can be a conventional server computer system.

Alternatively, as well-known, a server computer system 928 can be directly coupled to the LAN 922 through a network interface 934 to provide files 936 and other services to the clients 924, 926, without the need to connect to the Internet through the gateway system 920. Furthermore, any combination of client systems 912, 916, 924, 926 may be connected together in a peer-to-peer network using LAN 922, Internet 902 or a combination as a communications medium.

Generally, a peer-to-peer network distributes data across a network of multiple machines for storage and retrieval without the use of a central server or servers. Thus, each peer network node may incorporate the functions of both the client and the server described above.

Figure 10:
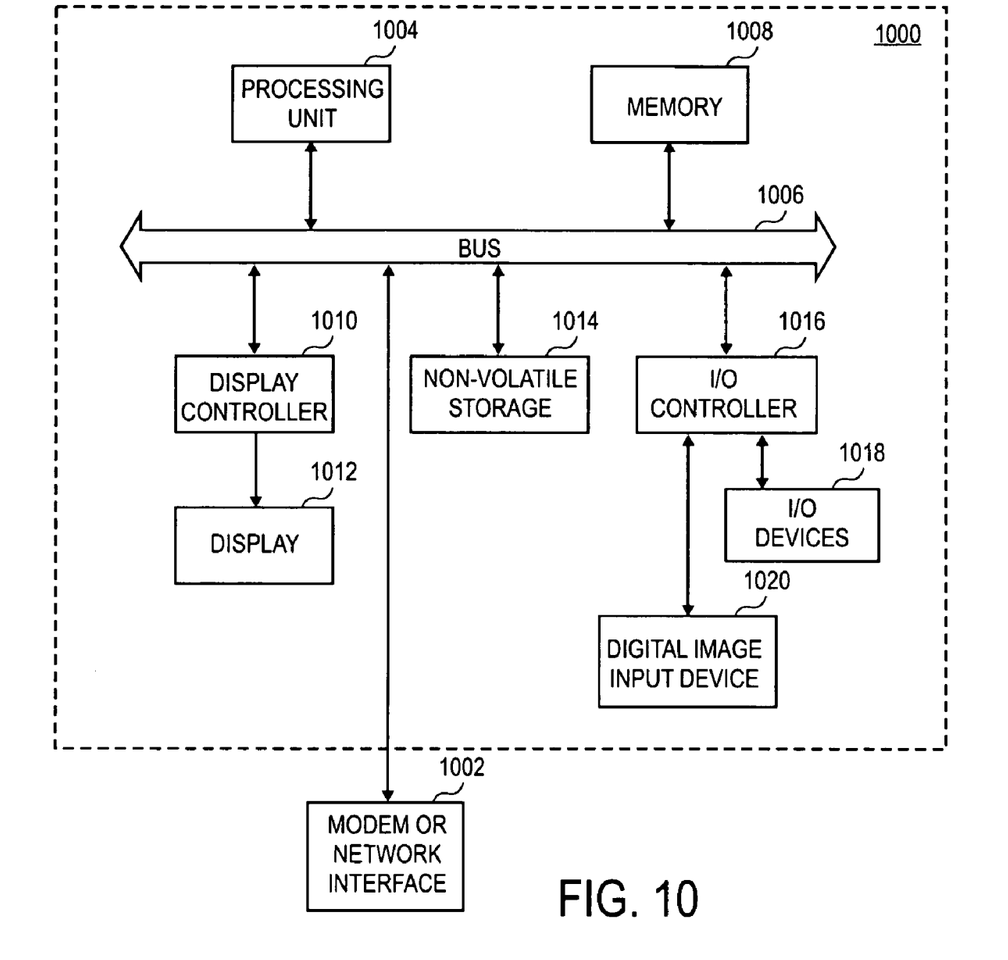
FIG. 10 a diagram of one embodiment of a data processing system, such as a general purpose computer system, suitable for use in the operating environment of FIG. 2.

The following description of FIG. 10 is intended to provide an overview of computer hardware and other operating components suitable for performing the processes of the invention described above, but are not intended to limit the applicable environments. One of skill in the art will immediately appreciate that the embodiments of the invention can be practiced with other computer system configurations, including set-top boxes, hand-held devices, multiprocessor systems, microprocessor-based or programmable consumer electronics, network PCs, minicomputers, mainframe computers, and the like. The embodiments of the invention can also be practiced in distributed computing environments where tasks are performed by remote processing devices that are linked through a communications network, such as peer-to-peer network infrastructure.

FIG. 10 shows one example of a conventional computer system that can be used in one or more aspects of the invention. The computer system 1000 interfaces to external systems through the modem or network interface 1002. It will be appreciated that the modem or network interface 1002 can be considered to be part of the computer system 1000. This interface 1002 can be an analog modem, ISDN modem, cable modem, token ring interface, satellite transmission interface, or other interfaces for coupling a computer system to other computer systems. The computer system 1002 includes a processing unit 1004, which can be a conventional microprocessor such as an Intel Pentium microprocessor or Motorola Power PC microprocessor. Memory 1008 is coupled to the processor 1004 by a bus 1006. Memory 1008 can be dynamic random access memory (DRAM) and can also include static RAM (SRAM). The bus 1006 couples the processor 1004 to the memory 1008 and also to non-volatile storage 1014 and to display controller 1010 and to the input/output (I/O) controller 1016. The display controller 1010 controls in the conventional manner a display on a display device 1012 which can be a cathode ray tube (CRT) or liquid crystal display (LCD). The input/output devices 1018 can include a keyboard, disk drives, printers, a scanner, and other input and output devices, including a mouse or other pointing device. The display controller 1010 and the I/O controller 1016 can be implemented with conventional well known technology. A digital image input device 1020 can be a digital camera which is coupled to an I/O controller 1016 in order to allow images from the digital camera to be input into the computer system 1000. The non-volatile storage 1014 is often a magnetic hard disk, an optical disk, or another form of storage for large amounts of data. Some of this data is often written, by a direct memory access process, into memory 1008 during execution of software in the computer system 1000. One of skill in the art will immediately recognize that the terms "computer-readable medium" and "machine-readable medium" include any type of storage device that is accessible by the processor 1004 or by other data processing systems such as cellular telephones or personal digital assistants or MP3 players, etc.

Network computers are another type of computer system that can be used with the embodiments of the present invention. Network computers do not usually include a hard disk or other mass storage, and the executable programs are loaded from a network connection into the memory 1008 for execution by the processor 1004. A Web TV system, which is known in the art, is also considered to be a computer system according to the embodiments of the present invention, but it may lack some of the features shown in FIG. 10, such as certain input or output devices. A typical computer system will usually include at least a processor, memory, and a bus coupling the memory to the processor.

It will be appreciated that the computer system 1000 is one example of many possible computer systems, which have different architectures. For example, personal computers based on an Intel microprocessor often have multiple buses, one of which can be an input/output (I/O) bus for the peripherals and one that directly connects the processor 1004 and the memory 1008 (often referred to as a memory bus). The buses are connected together through bridge components that perform any necessary translation due to differing bus protocols.

It will also be appreciated that the computer system 1000 is controlled by operating system software, which includes a file management system, such as a disk operating system, which is part of the operating system software. One example of an operating system software with its associated file management system software is the family of operating systems known as WINDOWS OPERATING SYSTEM from Microsoft Corporation in Redmond, Wash., and their associated file management systems. The file management system is typically stored in the non-volatile storage 1014 and causes the processor 1004 to execute the various acts required by the operating system to input and output data and to store data in memory, including storing files on the non-volatile storage 1014.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented scenario analysis method of calculating multi-dimensional predicted historical or future dependent data that corresponds to a predicted or input scenario comprising:

receiving input data comprising multi-dimensional actual historical dependent data, multi-dimensional historical causal data, and a plurality of scenarios consisting of at least one of user input, predicted, and system generated activity data, wherein the actual historical dependent data includes unaggregated marketing data for a plurality of products, the multi-dimensional historical causal data comprises data affecting the multi-dimensional actual historical dependent data and may comprise data affecting the activity data, the activity data includes a plurality of predicted business drivers for each of the plurality of products and each scenario in the plurality of scenarios represents a scenario different from a scenario represented by the multi-dimensional actual historical dependent data;

calculating the set of multi-dimensional predicted historical or future dependent data using a predictive model and the input data, wherein the set of multi-dimensional predicted historical or future dependent data has the same granularity as the unaggregated marketing data included in the multi-dimensional actual historical dependent data, the activity data affects the set of multi-dimensional predicted historical or future dependent data, and each of the plurality of predicted business drivers contains at least one of price, merchandizing, advertising, distribution and competitive activity; and calculating business metrics based on the set of multi-dimensional predicted historical or future dependent data and the input data for the plurality of scenarios, wherein said business metrics consist of at least one of business outcome measures, business efficiency measures, and business sensitivity measures.

2. The computer implemented method of claim 1, wherein the input data is associated with a product.

3. The computer implemented method of claim 1, further comprising:
generating an analytical report from the predicted historical multi-dimensional dependent data.

4. The computer implemented method of the claim 3, wherein the analytical report is selected from the group of due-to report, volume decomposition, scenario and financial information.

5. The computer implemented method of claim 4, wherein generating the analytical report comprises:
generating a due-to report by,
calculating a contribution for each of the business drivers in the set of scenario input data by varying that business driver to determine a change in the calculated set of multi-dimensional predicted dependent data.

6. The computer implemented method of claim 4, wherein the calculating a contribution for a first business driver of the business drivers comprises:
manipulating a second business driver in addition to manipulating the first business driver if the first business driver depends on the second business driver.

7. The computer implemented method of claim 4, wherein generating the analytical report comprises:
generating a volume decomposition report by,
for each of the business drivers,
determining a point where that business driver has zero contribution, and
varying that business driver to determine a volume contribution to the set of calculated multi-dimensional predicted dependent data from that business driver.

8. The computer implemented method of claim 1, further comprising:
validating the predictive model by comparing the predicted multi-dimensional historical dependent data with the multi-dimensional actual historical dependent data.

9. The computer implemented method of claim 1, further comprising:
validating the predictive model by accruing additional multi-dimensional historical dependent data and comparing the additional multi-dimensional historical dependent data with the multi-dimensional predicted dependent data.

10. The computer implemented method of claim 1, wherein the unaggregated marketing data includes sale, time, and location data for each of the plurality of products.

11. The computer implemented method of claim 1, further comprising:
calculating the activity data from the multi-dimensional actual historical dependent data and the predictive model.

12. A machine-readable storage medium having executable instructions to cause a processor to perform to method comprising:
receiving input data comprising multi-dimensional historical actual dependent data, multi-dimensional historical causal data, and a plurality of scenarios consisting of at least one of user input, predicted, and system generated activity data, wherein the historical actual dependent data includes unaggregated marketing data for a plurality of products, the multi-dimensional historical causal data comprises data affecting the multi-dimensional actual historical dependent data and may comprise data affecting the activity data, and the activity data that includes a plurality of predicted business drivers for each of the plurality of products and each scenario in the plurality of scenarios represents a scenario different from a scenario represented by the multi-dimensional actual historical dependent data;
calculating a set of multi-dimensional historical predicted dependent data using a predictive model and the input data, wherein the set of multi-dimensional predicted historical or future dependent data has the same granularity as the unaggregated marketing data, the predicted activity data affects the set of multi-dimensional predicted historical or future dependent data, and each of the plurality of business drivers contains at least one of price, merchandizing, advertising, distribution and competitive activity; and
calculating business metrics based on the set of multi-dimensional predicted historical or future dependent data and the input data for the plurality of scenarios, wherein said business metrics consist of at least one of business outcome measures, business efficiency measures, and business sensitivity measures.

13. The machine-readable storage medium of claim 12, wherein the method further comprises:
generating analytical reports from the set of predicted historical multi-dimensional dependent data.

14. The machine-readable storage medium of claim 12, wherein the method further comprises:
validating the predictive model comparing the predicted multi-dimensional historical dependent data with the multi-dimensional historical dependent data.

15. An apparatus comprising:
a memory;
a data collection module to receive input data that comprises multi-dimensional actual historical dependent data, multi-dimensional historical causal data, and a plurality of scenarios consisting of at least one of user input, predicted, and system generated activity data, wherein the actual historical dependent data includes unaggregated marketing data for a plurality of products, the multi-dimensional historical causal data comprises data affecting the multi-dimensional actual historical dependent data and may comprise data affecting the activity data, and the activity data that includes a plurality of predicted business drivers for each of the plurality of products and each scenario in the plurality of scenarios represents a scenario different from a scenario represented by the multi-dimensional actual historical dependent data;
a predictive model module to receive a predictive model;
a predictive dependent data module to calculate a set of multi-dimensional predicted historical or future dependent data using the predictive model and the input data, wherein the set of multi-dimensional predicted historical or future dependent data has the same granularity as the unaggregated marketing data, the activity data affects the set of multi-dimensional predicted historical or future dependent data, and each of the plurality of predicted business drivers contains at least one of price, merchandizing, advertising, distribution and competitive activity; and a non-measurable data model module to calculate business metrics based on the set of multi-dimensional predicted historical or future dependent data and the input data for the plurality of scenarios, wherein said business metrics consist of at least one of business outcome measures, business efficiency measures, and business sensitivity measures.

16. The apparatus of claim 15, further comprising:
an analysis module to generate analytical reports from the predicted historical or future dependent data.

17. The apparatus of claim 15, further comprising:
a model validation module to validate the predictive model.

18. The apparatus of claim 17, wherein the validation of the predictive model is selected from the group of accruing additional multi-dimensional historical dependent data and comparing the additional multi-dimensional historical dependent data with the predicted dependent and generating predicted multi-dimensional historical dependent data from the predictive model and comparing the predicted multi-dimensional historical dependent data with the multi-dimensional historical dependent data.

19. A system comprising:
a processor;
a memory coupled to the processor though a bus; and
a process executed from the memory by the processor to cause the processor to,
receive input data comprising multi-dimensional actual historical dependent data, multi-dimensional historical causal data, and a plurality of scenarios consisting of at least one of user input, predicted, and system generated activity data, wherein the actual historical dependent data includes unaggregated marketing data for a plurality of products, the multi-dimensional historical causal data comprises data affecting the multi-dimensional actual historical dependent data and may comprise data affecting the activity data, and the activity data that includes a plurality of predicted business drivers for each of the plurality of products and each scenario in the plurality of scenarios represents a scenario different from a scenario represented by the multi-dimensional actual historical dependent data;
calculate a set of multi-dimensional predicted historical or future dependent data using a predictive model and the input data, wherein the set of multi-dimensional predicted historical or future dependent data has the same granularity as the unaggregated marketing data, the activity data affects the set of multi-dimensional predicted historical or future dependent data, and each of the plurality of predicted business drivers contains at least one of price, merchandizing, advertising, distribution and competitive activity; and
calculate business metrics based on the set of multi-dimensional predicted historical or future dependent data and the input data for the plurality of scenarios, wherein said business metrics consist of at least one of business outcome measures, business efficiency measures, and business sensitivity measures.

20. The system of claim 19, wherein the process further causes the processor to generate analytical reports from the set of multi-dimensional predicted dependent data.

21. The system of claim 19, wherein the process further causes the processor to validate the predictive model by generating predicted set of multi-dimensional historical dependent from the predictive model and comparing the predicted set of multi-dimensional historical dependent data with the set of multi-dimensional historical dependent data.

22. The system of claim 19, wherein the process further causes the processor to validate the predictive model by accruing additional set of multi-dimensional historical dependent data and comparing the additional set of multi-dimensional historical dependent data with the set of multi-dimensional predicted dependent data.

* * * * *